United States Patent Office 3,448,037
Patented June 3, 1969

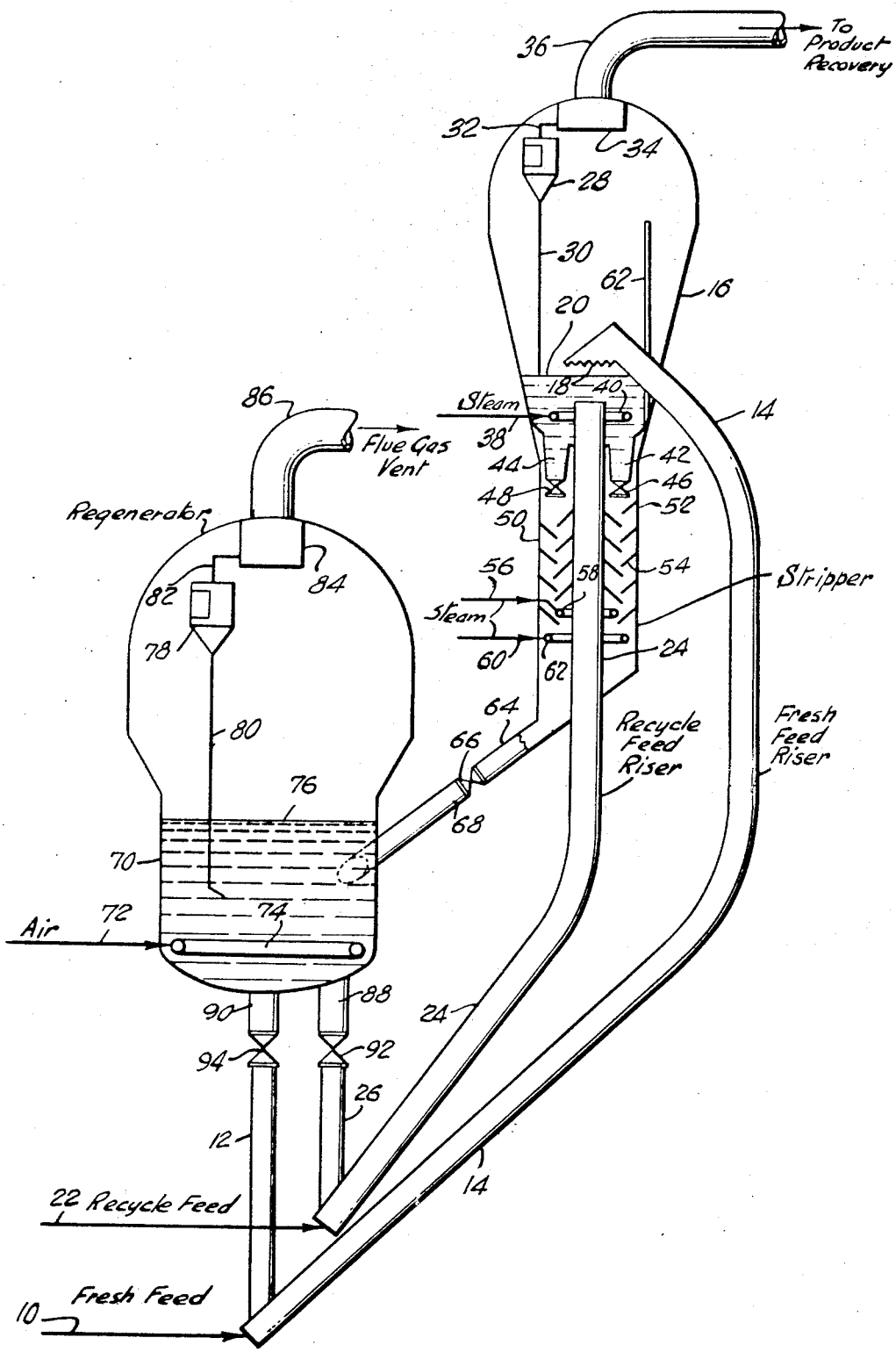

3,448,037
CRACKING WITH CRYSTALLINE
ZEOLITE CATALYST
Dorrance P. Bunn, Jr., Henry B. Jones, and Richard E. Nagle, all c/o Texaco Inc., P.O. Box 52332, Houston, Tex. 77052
Continuation-in-part of application Ser. No. 598,281, Dec. 1, 1966. This application June 18, 1968, Ser. No. 737,890
Int. Cl. C10g 25/06, 37/04
U.S. Cl. 208—164
14 Claims

ABSTRACT OF THE DISCLOSURE

This invention relates to an improved method for the fluid catalytic cracking of hydrocarbon oils where a virgin gas oil and a cracked cycle gas oil are individually cracked through separate elongated reaction zones with a zeolite cracking catalyst under high conversion conditions, combining the zeolite catalysts from the individual elongated reaction zones into a dense phase fluidized bed and further converting the cracked cycle gas oil effluent in the bed. A particular advantage of the instant method resides in its higher gasoline and lower coke and dry gas yields.

Cross references to related applications

This application is a continuation-in-part of our copending application Ser. No. 598,281, filed Dec. 1, 1966 entitled "Method and Apparatus for Fluid Catalytic Cracking." The method of this invention may incorporate the improvement in fluid catalytic cracking and catalyst regeneration disclosed and claimed in the application of Dorrance P. Bunn, Jr. et al. entitled "Method and Apparatus for the Regeneration of Catalyst in the Fluid Catalytic Process," Ser. No. 603,834 filed Dec. 22, 1966, now Patent No. 3,394,076.

This invention relates to an improved method for the fluid catalytic cracking of hydrocarbon oils. In particular, this invention relates to the fluid catalytic cracking of at least two feedstocks wherein at least one of the feedstocks is a refractory cycle gas oil.

In the fluid catalytic cracking process, hydrocarbons are converted under conditions such that substantial portions of a hydrocarbon feed are transformed into desirable products such as, gasoline, liquefied petroleum gas, alkylation feedstocks and middle distillate blending stocks with concomitant by-product formation of an undesirable nature. A particularly deleterious by-product of the process is coke which in the course of the hydrocarbon conversion reaction is deposited upon the catalyst. When substantial amounts of coke deposition occur, reduction in catalyst activity and particularly catalyst selectivity results thereby deterring hydrocarbon conversion, reducing gasoline production and simultaneously increasing the production of less desired products. To overcome such catalyst deactivation through coke deposition, the catalyst is normally withdrawn from the reaction zone and passed to a stripping zone wherein entrained and adsorbed hydrocarbons are initially displaced from the catalyst by means of a stripping medium such as steam. The stripping medium and removed hydrocarbons are removed and stripped catalyst is passed to a regeneration zone where it is contacted with an oxygen containing gas effecting combustion of at least a portion of the coke and regeneration of the catalyst. Thereafter the regenerated catalyst is reintroduced to the reaction zone and therein contacted with additional hydrocarbon.

While the catalyst regeneration and reactivation technique described above permits the reintroduction of the catalyst into the hydrocarbon conversion process, the problem of substantially converting refractory materials such as cycle gas oils to desirable products continues to exist inasmuch as such refractory materials in the course of conversion rapidly deposit coke upon the active catalyst thereby quickly interfering with the catalytic cracking of the refractory material. To overcome the problems associated wtih catalyst coke deposition the art proposed that higher reaction temperatures be employed. However, operation at elevated temperatures resulted in decreased gasoline selectivity at given conversion levels.

It is therefore an object of this invention to provide an improved method for the catalytic conversion of hydrocarbon streams.

Another object of this invention is to provide a method whereby hydrocarbon streams are selectively converted to gasoline possessing high octane quality in substantial yields.

Yet another object of this invention is to provide a method to produce high yields of middle distillates at a given conversion level.

A still further object of this invention is to provide an improved method for the fluid catalytic cracking of hydrocarbon streams where the hydrocarbon stream is contacted with catalyst possessing maximum activity and selectivity under conditions providing maximum recovery of desired products with minimal formation of undesired material.

Other objects and advantages will become apparent from a reading of the following detailed description.

Broadly, this invention contemplates a method for the fluid catalytic cracking of a first hydrocarbon stream comprising a virgin gas oil and a second hydrocarbon stream comprising a cracked cycle gas oil which comprises the steps of:

(a) passing said first stream and a zeolite cracking catalyst through a first elongated reaction zone at a temperature of from about 840 to 1100° F. at a conversion of from 40 to 80 volume percent and where coke is deposited on said catalyst in an amount less than 0.9 weight percent of said catalyst;

(b) passing said second stream and a zeolite cracking catalyst through a second elongated reaction zone at a temperature of from about 840 to 1100° F. and at a conversion of from 15 to 60 volume percent and where coke is deposited on said catalyst in an amount less than 1.2 weight percent of said catalyst;

(c) discharging the effluent from said first elongated reaction zone, said effluent comprising vaporous reaction products and catalyst containing less than 0.9 weight percent coke into a disengaging space above a dense phase fluidized catalyst bed;

(d) discharging the effluent from said second elongated reaction zone, said effluent comprising vaporous reaction products and catalyst containing less than 1.2 weight percent coke into the lower portion of said bed;

(e) combining said catalysts of steps (c) and (d) in said bed and further converting said vaporous products of (d) in said bed;

(f) passing vaporous products of said further conversion in step (e) into said disengaging space and withdrawing said vaporous products along with said vaporous products of step (c) from said disengaging space; and (g) withdrawing, stripping and regenerating catalyst from step (e and introducing regenerated catalyst into steps (a) and (b).

In accordance with the present invention the first hydrocarbon stream comprises a virgin gas oil. Among the stocks contemplated as applicable in the first hydrocarbon stream we mean to include stocks boiling from about 430° F. to 1050° F. comprising heavy atmospheric gas oils, light and heavy vacuum gas oils, gas oils from coking operations, visbroken gas oils, deasphalted gas oils, decarbonized gas oils, hydrotreated gas oils and solvent extracted gas oils.

The second hydrocarbon stream mentioned above comprises a more refractory stock than the first hydrocarbon stream and is referred to herein as comprising a cracked cycle gas oil. By such a stream we mean to include stocks boiling from about 430° F. to 900° F. principally comprising a stream boiling above gasoline and preferably a recycle stock from the reactor boiling between about 600 and 800° F. comprising intermediate cycle gas oils.

The catalyst employed in the instant invention comprises an active metal oxide, as exemplified by a silicalumina gel and clay, and a large pore crystalline aluminosilicate customarily referred to as zeolites. The zeolites employed as cracking catalyst herein possesses ordered rigid three-dimensional structures having uniform pore diameters within the range of from about 5 to about 15 angstroms. Again the composite crystalline zeolitic catalysts employed herein comprise about 1 to 25 weight percent zeolite, about 10 to 50 weight percent alumina and the remainder silica. In general, the zeolitic catalysts which form the high activity component of the catalyst are alkali metal crystalline alumino-silicates which have been treated to replace all or at least a substantial portion of the original alkali metal ions with other cations such as hydrogen and/or a metal or combination of metals, such as barium, calcium, magnesium, manganese or rare earths such as cerium, lanthanum, neodymium, praseodymium, samarium and yttrium. The zeolites contemplated above may be represented by the formula: $M_{2/n}O:Al_2O_3:xSiO_2:yH_2O$ where M represents hydrogen or a metal, $n$ its valence, $x$ has a value ranging from 2 to 10 and $y$ ranges from 0 to 10. In the instant invention the preferred fresh zeolites are represented by zeolite X and zeolite Y where M is selected from the group consisting of hydrogen, calcium, manganese and rare earth metals where the zeolite content of the fresh catalyst varies from about 5 to 20 weight percent and where M is selected from the group cerium and lanthanum. Fresh catalyst is easily introduced into the instant processing scheme through the regeneration zone where under regeneration conditions an equilibrium catalyst emerges therefrom possessing an average zeolitic content of less than 5 weight percent and an average carbon content of less than 0.3 weight percent. The zeolitic cracking catalyst is subsequently introduced to the first and second hydrocarbon streams as provided below.

As contemplated herein the first and second hydrocarbon streams are converted in the presence of a zeolitic cracking catalyst through separate elongated reaction zones. With regard to the first hydrocarbon stream comprising a virgin gas oil the conversion is undertaken at a temperature ranging from about 840 to 1100° F. and preferably at temperatures ranging from 880° F. to 975° F. where the stream undergoes a conversion within the range of about 40 to 80 preferably from 50 to 70 where the conversion is defined as 100 minus volume percent of product boiling above 430° F.

Conversions within the range stated above in combination with a coke deposition not exceeding 0.9 weight percent of the catalyst is accomplished by operating within the following parameters: the catalyst to oil ratio employed is maintained within the range of from 4.5 to 15.0 and preferably from 5.5 to 10.0. Other conditions within the elongated reaction zone include, for example, residence times of the hydrocarbon of from 2 to 8 seconds, and preferably from 3.5 to 6.0 seconds, superficial vapor velocities (calculated velocity based upon free volume of conduit) of from 15 to 50 feet per second and preferably from 20 to 40 feet per second, weight hourly space velocities of from 10 to 100 and preferably from 40 to 65 and an equilibrium catalyst activity (Texaco D+L) of from 25 to 60. The tests for catalytic activity consists of employing 400 grams of catalyst under the following test conditions:

Reactor temperature, °F. _____ 920
Space velocity, $w_{.oil}/hr./w_{.catalyst}$ _____ 2.0
Weight ratio: catalyst/oil _____ 1.0
Reaction time, hr. _____ 0.5

The activity is measured by fractionating the cracked liquid product to a 390° F. cut point. The activity is calculated as 100— volume percent gas oil above 390° F. recovered from the fractionator.

Operating in accordance with the conditions specified herein, coke is deposited on the catalyst in an amount less than 0.9 weight percent of the catalyst as the catalyst emerges from the first elongated reaction zone.

With regard to the second hydrocarbon stream comprising a cycle gas oil the conversion is undertaken at a temperature ranging from about 840 to 1100° F. and preferably at temperatures ranging from 900 to 1000° F. where the stream undergoes a conversion as heretofore defined within the range of about 15 to 60 and preferably 25 and 50.

Conversion within the range stated above in the second elongated reaction zone in combination with a coke deposition not exceeding 1.2 weight percent of the catalyst is accomplished by operating as follows. Operatively, the catalyst to oil ratio employed is maintained within the range of from 4.5 to 15 and preferably from 5.5 to 10.0. Other conditions within the second elongated reaction zone include, for example, residence times of from 2 to 8 seconds and preferably from 3.5 to 6 seconds, superficial vapor velocities of from 15 to 50 feet per second and preferably from 20 to 40 feet per second, weight hourly space velocities of from 10 to 100 and preferably from 40 to 65 and an equilibrium catalyst activity (Texaco D+L) of from 25 to 60. Operating in accordance with the specified conditions, coke is deposited on the catalyst in an amount less than 1.2 weight percent of the catalyst as the catalyst emerges from the second elongated reaction zone.

The effluent from the first elongated reaction zone comprising vaporous reaction products and catalyst containing less than 0.9 weight percent coke is discharged into a disengaging space above a dense phase fluidized bed. By discharging into such a disengaging space the velocity of the stream is reduced to a vapor velocity less than 4.0 feet per second such that the vaporous products and coked catalyst became disengaged permitting the vaporous products to be removed from the disengaging space. By employing vapor velocities less than 4.0 feet per second the catalyst falls from the disengaging space into a dense phase fluidized bed which will be described in greater detail below.

The effluent from the second elongated reaction zone comprising vaporous reaction products and catalyst containing less than 1.2 weight percent coke is discharged from the second elongated reaction zone into the lower portion of the dense phase fluidized bed wherein further conversion of the vaporous products occurs. Catalyst from the first elongated reaction zone possessing lower percent of coke is combined with the catalyst from the second elongated reaction zone and the combined catalysts possessing higher activity than the catalyst discharging in the effluent from the second elongated reaction zone is contacted with the more refractory cycle gas oil effluent and undergoes further conversion. The vapor velocities in the bed are maintained in the range of from 0.5 to 4.0 and preferably between 1.3 and 2.2 feet per second and where the bed is maintained at a temperature of from 840 to 1100° F. and preferably from 885 to 980° F. and at a weight hourly space velocity of from 2.0 to 40.0 and preferably from 3.0 to 25.0. By permitting the vaporous products of the second stream to be contacted with the combined dense phase fluidized bed catalyst a further conversion of from 5 to 20 volume percent of the vaporous products occurs and the conversion is substantially terminated when the vaporous materials reach the disengaging space above the bed and are withdrawn along with the vaporous products of the first stream. The cracked products disengage from the catalyst in the dense phase bed at vapor velocities less than 4.0 feet per second.

As provided in co-pending application Ser. No. 598,281 and assigned to the assignee hereof, an apparatus applicable to the instant invention is provided whereby a portion of the reaction is effected in a tapered reaction chamber having a greater diameter at its upper portion than at the lower portion and thereby forming a frusto-conic reaction zone. While the arrangement described in the co-pending application represents a preferred embodiment, other arrangements may be employed.

To maintain the activity of the catalyst in the dense phase fluidized bed, catalyst is continuously withdrawn from the reaction zone and passed to a separate stripping zone where the catalyst is contacted with a stripping medium such as steam. Generally, a stripping zone consists of a torturous path for catalyst flow where the catalyst is contacted with steam at temperatures ranging from approximaely 840 to 1100° F. as is well known in the art. In this manner, the catalyst withdrawn from the bed is stripped of entrained and absorbed hydrocarbon and the stripping medium and hydrocarbon is discharged from the stripping zone and the catalyst passed on to a regeneration zone where it is contacted with, for example, air at regeneration temperatures of from about 1100 to 1200° F. thereby burning the carbon on the surface of the catalyst such that the coke content of the catalyst is reduced to a level of less than 0.3 weight percent. The regenerated catalyst is subsequently reintroduced to the first and second hydrocarbon streams. As previously described, fresh catalyst is periodically introduced through the regenerator. This invention may incorporate the improvements regarding fresh catalyst treatment disclosed and claimed in the application of Gerald V. Nelson, Douglas J. Youngblood and James H. Colvert, entitled "Improved Zeolitic Catalytic Cracking Catalysts," Ser. No. 717,968, filed Apr. 1, 1968 wherein the activity, selectivity and attrition resistance of zeolite cracking catalysts are substantially improved by treating the fresh catalyst at a temperature above 1300° F. and below the thermal destructive temperature of the zeolite in the absence of steam.

As provided by the instant invention, the vaporous products and catalyst of the first hydrocarbon stream are disengaged as rapidly as possible consistent with the conversion levels heretofore recited. Prolonged contact between the catalyst and product in the reaction zones results in polymerized products whereas abbreviated contact conditions result in reduced naphtha selectivity. Moreover, by employing the separate cracking procedures outlined above for the respective streams, the more easily cracked virgin components can be subjected to lower cracking severity than the highly refractive recycle stocks. Further, it has been found that, in accordance with the instant method by utilizing the zeolite catalysts of type hereinabove specified a lower coke content is deposited on the catalyst surface, particularly during the cracking of the virgin gas oil. The benefit to be derived from the lower coked catalyst is translatable into the amount of additionally cracked refractory material produced emerging from the dense phase fluidized bed.

The table below provides a comparison of yields at constant conversion conditions and within the operative ranges hereinabove specified where a zeolite cracking catalyst of the type contemplated herein was compared to a conventional silica-alumina cracking catalyst.

| Catalyst | Zeolite | Conventional |
| --- | --- | --- |
| Conversion, volume percent basis fresh feed | 65 | 65 |
| Throughput ratio | 1.5 | 1.5 |
| Yields basis fresh feed: | | |
| Gas ($C_2$ and lighter), weight percent | 2.2 | 5.1 |
| Total $C_3$, volume percent | 7.8 | 7.2 |
| Total $C_4$, volume percent | 13.1 | 13.0 |
| $C_5$+naphtha, volume percent | 52.2 | 45.6 |
| LCGO (650° F. EP), volume percent | 33.1 | 33.0 |
| HCGO, volume percent | 1.9 | 2.0 |
| Coke, weight percent | 5.3 | 6.7 |

As can be seen when operating in accordance with the instant invention and employing a zeolite cracking catalyst, higher gasoline and lower coke and dry gas yields are obtained representing a substantial economic advantage.

Further, the instant method provides a scheme whereby high catalyst activity is effectively employed through improved utilization such that in the absence of hydrotreating, for example, debutanized naphtha to conversion volume ratios of 0.7 and higher can be obtained in the 55 to 85 volume percent conversion range. One unexpected benefit derived is the relatively constant and high naphtha selectivity over the above conversion range while simultaneously maintaining a high naphtha research octane number (leaded 3 cc. TEL) of approximately 99. This benefit derived herewith was unexpected inasmuch as one ordinarily increases naphtha selectivity at the expense of naphtha octane. Here, we simultaneously provide high octanes and high naphtha selectivity. By naphtha selectivity we mean the volume ratio of debutanized naphtha to conversion.

The accompanying figure illustrates and exemplifies an apparatus by which the method of the present invention may be practiced and is not intended to restrict the invention thereby since modification may be made within the scope of the claims without departing from the spirit thereof.

Referring to the figure, a virgin gas oil feed in line 10 is contacted with hot regenerated equilibrium molecular sieve zeolite catalyst having a carbon content of less than 0.3 weight percent from standpipe 12, the catalyst at a temperature of about 1150° F. in the inlet portion of fresh feed riser 14. The resulting suspension of catalyst in oil vapor at a temperature of about 900° F. and at an average velocity of about 28 feet per second passes upwardly through feed riser 14 and into tapered reactor 16. Fresh feed riser 14 terminates in a downwardly directed outlet having a serrated edge 18. The purpose of the serrated edge 18 is to provide smooth flow of the hydrocarbon vapors from conduit 14 into reactor 16 particularly when dense bed level 20 below serrated edge 18 fluctuates nearer the outlet of riser 14 as defined by serrated edge 18. Conditions prevailing in the fresh feed riser include a catalyst to oil ratio of 6.0 and a weight hourly space velocity of 60. The vapor velocity, 28 feet per second, in fresh feed riser 14 provides a residence time of approximately 4.5 seconds. Substantial conversion of the fresh feed occurs in the riser and at these conditions amounts to a conversion of approximately 50 volume percent of the fresh feed to products boiling below 430° F. The catalyst emerging from riser 14 contains 0.75 weight percent coke.

An intermediate cycle gas oil fraction separated from the cracked products in fractionation equipment not shown having a gravity of about 22° API and an end point of about 800° F. is introduced through line 22 into the inlet section of cycle gas oil riser 24 wherein it is contacted with hot zeolite catalyst described above from standpipe 26. The resulting catalyst vapor mixture at a temperature of about 930° F. passes upwardly through cycle gas oil riser 24 at an average velocity of about 25 feet per second with an average residence time of about 5.0 seconds. Other conditions in the recycle riser include a catalyst oil ratio of 5.5 and a weight hourly space velocity of 55. About 28 percent of the cycle gas oil is converted to products boiling below 430° F. by the time the products are disengaged through the outlet of riser 24 into the lower portion of reactor 16. The catalyst emerging from riser 24 contains 0.90 weight percent coke.

The effluent of the cycle gas oil riser passes upwardly through the dense phase bed in reactor 16 effecting further conversion of the cycle gas oil to 33 volume percent of products boiling below 430° F. Other conditions in the bed in reactor 16 include an average of 0.81 weight percent coke on the zeolite catalyst in the area between the bed surface and riser 24, a catalyst oil ratio of 16 and a weight hourly space velocity of 23. The combined fresh feed riser cracking, recycle riser cracking, and reactor bed cracking provide an overall conversion basis fresh feed of 67 volume percent of the fresh feed products boiling below 430° F. The vapor velocities in the reactor are 1.5 feet per second at the point at which the recycle riser discharges, 1.2 feet per second at the point of vapor disengagement from the dense phase bed at a level 20, 3.1 feet per second at the point where the fresh feed riser discharges, and 1.8 feet per second at the upper portion of the cyclone inlets.

Cracked products disengage from the catalyst above the dense phase bed level 20 and the vapors of any entrained catalyst pass through cyclone 28 wherein entrained catalyst is separated and returned to the bed through dipleg 30. Although a single cyclone is shown for clarity it will be understood that several cyclones may be assembled in a series to achieve substantially complete separation and a plurality of such assemblies may be employed to handle the volume of the vapor encountered. Effluent gases pass from cyclone 28 through line 32 to plenum chamber 34 wherein the gases from other cyclone assemblies not shown are collected and discharged from the reactor through line 36. Vapor line 36 conveys the cracked products to fractionation facilities, not shown, wherein the conversion products are recovered and separated into desired products and recycle streams by compression, absorption and distillation facilities well known in the art.

Steam in line 38 is passed to steam ring 40 and discharges into the lower portion of reactor 16 at a point just below the outlet of recycle riser 24. Dense phase catalyst in the lower portion of reactor 16 is stripped by steam from ring 40 and passes downwardly through standpipes 42 and 44 and slide valves 46 and 48 into stripping zone 50. Stripping zone 50 is provided with baffles 52 attached to riser 24 and baffles 54 attached to the wall of stripper 50. Steam in line 56 is discharged through steam ring 58 into the lower portion of stripper 50 under baffles 52 and through line 60 and steam ring 62 under baffles 54. Steam rising through stripper 50 displaces and removes adsorbed and entrained hydrocarbon vapors which pass upwardly through stripper vent line 62 discharging into the upper portion of reactor 16.

Stripped catalyst is withdrawn from the bottom of stripper 50 through spent catalyst standpipe 64 at a rate controlled by slide valve 66 and discharges through standpipe 68 into regenerator 70. In regenerator 70 the spent catalyst is contacted with air introduced through line 72 and air ring 74. Catalyst undergoing regeneration in regenerator 70 forms a dense bed having a top level 76. In regenerator 70 carbon on the surface of the catalyst is burned and the resulting flue gas passes upwardly and enters cyclone 78 wherein entrained catalyst is separated and returned to the regenerator dense bed through dipleg 80. Cyclone 78 although represented as a single vessel may, of course, comprise an assembly of cyclones arranged in parallel and in series to effect substantially complete separation of entrained solids from the flue gas. Effluent flue gas from cyclone 78 is passed through line 82 into the plenum chamber 84 and outwardly through flue line 86 to vent facilities, not shown, which may include means to recover heat from hot flue gases, means to utilize unconsumer carbon monoxide by the generation of additional heat and means to recover energy by the generation of steam or by expansion through turbines with the generation of power as is well known in the art. Regenerated catalyst is withdrawn from the bottom of the regenerator 70 through lines 88 and 90 at rates controlled by slide valves 92 and 94 to supply the hot regenerated catalyst to standpipes 26 and 12 as described above.

We claim:
1. A method for the fluid catalytic cracking of a first hydrocarbon stream comprising a virgin gas oil and a second hdyrocarbon stream comprising a cracked cycle gas oil which comprises the steps of:
  (a) passing said first stream and a crystalline zeolite cracking catalyst of uniform pore size through a first elongated reaction zone at a temperature of from about 840 to 1100° F. at a conversion of from 40 to 80 volume percent and where coke is deposited on said catalyst in an amount less than 0.9 weight percent of said catalyst;
  (b) passing said second stream and a crystalline zeolite cracking catalyst of uniform pore size through a second elongated reaction zone at a temperature of from about 840 to 1100° F. and at a conversion of from 15 to 60 volume percent and where coke is deposited on said catalyst in an amount less than 1.2 weight percent of said catalyst;
  (c) discharging the effluent from said first elongated reaction zone, said effluent comprising vaporous reaction products and catalyst containing less than 0.9 weight percent coke into a disengaging space above a dense phase fluidized catalyst bed;
  (d) discharging the effluent from said second elongated reaction zone, said effluent comprising vaporous reaction products and catalyst containing less than 1.2 weight percent coke into the lower portion of said bed;
  (e) combining said catalysts of steps (c) and (d) in said bed and further converting said vaporous products of (d) in said bed;
  (f) passing vaporous products of said further conversion in step (e) into said disengaging space and withdrawing said vaporous products along with said vaporous products of step (c) from said disengaging space; and
  (g) withdrawing, stripping and regenerating catalyst from step (e) and introducing regenerated catalyst into steps (a) and (b).

2. A method according to claim 1 wherein the catalyst to oil weight ratio of step (a) is from 4.5 to 15.0.

3. A method according to claim 1 wherein the residence time of step (a) is from 2 to 8 seconds.

4. A method according to claim 1 wherein the superficial vapor velocity of step (a) is from 15 to 50 feet per second.

5. A method according to claim 1 wherein the weight hourly space velocity of step (a) is from 10 to 100.

6. A method according to claim 1 wherein the catalyst to oil weight ratio of step (b) is from 4.5 to 15.0.

7. A method according to claim 1 wherein the residence time of step (b) is from 2 to 8 seconds.

8. A method according to claim 1 wherein the superficial vapor velocity of step (b) is from 15 to 50 feet per second.

9. A method according to claim 1 wherein the weight hourly space velocity of step (b) is from 10 to 100.

10. A method according to claim 1 wherein step (e) is conducted at a temperature of from 840 to 1100° F.

11. A method according to claim 1 wherein the vapor velocity of step (e) is from 0.5 to 4.0 feet per second.

12. A method according to claim 1 wherein the weight hourly space velocity of step (e) is from 2.0 to 40.0.

13. A method according to claim 1 wherein the conversion in the bed of step (e) is from 5 to 20 volume percent.

14. A method for the fluid catalytic cracking of a first hydrocarbon stream comprising a virgin gas oil and a second hydrocarbon stream comprising a cracked cycle gas oil which comprises the steps of:
(a) passing said first stream and a crystalline zeolite cracking catalyst of uniform pore size through a first elongated reaction zone at a temperature of from about 880 to 975° F., at a catalyst to oil ratio of from 5.5 to 10, for a residence time of from 3.5 to 6.0 seconds, at a superficial vapor velocity of from 20 to 40 feet per second and at a weight hourly space velocity of from 40 to 65 at a conversion of from 50 to 70 volume percent and where coke is deposited on said catalyst in an amount less than 0.9 weight percent of said catalyst;
(b) passing said second stream and a crystalline zeolite cracking catalyst of uniform pore size through a second elongated reaction zone at a temperature of from about 900 to 1000° F., at a catalyst to oil ratio of from 5.5 to 10, for a residence time of from 3.5 to 6.0 seconds, at a superficial vapor velocity of from 20 to 40 feet per second and at a weight hourly space velocity of from 40 to 65 and at a conversion of 25 to 50 volume percent and where coke is deposited on said catalyst in an amount less than 1.2 weight percent of said catalyst;
(c) discharging the effluent from said first elongated reaction zone, said effluent comprising vaporous reaction products and catalyst containing less than 0.9 weight percent coke, into a disengaging space above a dense phase fluidized catalyst bed at a disengaging velocity of less than 4.0 feet per second.
(d) discharging the effluent from said second elongated reaction zone, said effluent comprising vaporous reaction products and catalyst containing less than 1.2 weight percent coke, into the lower portion of said bed;
(e) combining said catalysts of step (c) and (d) in said bed and further converting 5 to 20 volume percent of said vaporous product of (d) at a temperature of from about 885 to 980° F. at a vapor velocity of from 1.3 to 2.2 feet per second and at a weight hourly space velocity of from 3.0 to 25.0;
(f) passing vaporous products of said further conversion in step (e) into said disengaging space and withdrawing said vaporous products along with said vaporous products of step (c) from said disengaging space; and
(g) withdrawing, stripping and regenerating catalyst from step (e) and introducing regenerated catalyst into steps (a) and (b).

References Cited

UNITED STATES PATENTS

| | | | |
|---|---|---|---|
| 3,053,753 | 9/1962 | Slyngstad et al. | 208—164 |
| 3,142,543 | 7/1964 | Slyngstad et al. | 208—164 |
| 3,188,184 | 6/1965 | Rice et al. | 208—164 |
| 3,188,185 | 6/1965 | Slyngstad et al. | 208—164 |
| 3,380,911 | 4/1968 | Owen | 208—164 |
| 3,392,110 | 7/1968 | Payne | 208—120 |
| 3,394,075 | 7/1968 | Smith | 208—164 |

HERBERT LEVINE, *Primary Examiner.*

U.S. Cl. X.R.

208—74, 75, 78, 155

PO-1050
(5/69)

UNITED STATES PATENT OFFICE
CERTIFICATE OF CORRECTION

Patent No. 3,448,037          Dated June 18, 1968

Inventor(s) Dorrance P. Bunn, Jr., Henry B. Jones & Richard E. Nagle

It is certified that error appears in the above-identified patent and that said Letters Patent are hereby corrected as shown below:

Column 1, lines 5 and 6, cancel "c/o Texaco Inc., P. O. Box 52332, Houston, Tex. 77052" and insert -- Houston, Tex., assignors to Texaco Inc., New York, N. Y. a corporation of the State of Delaware --. Column 2, line 13, "wtih" should read -- with --. Column 3, line 5, "(e" should read -- (e) --.

SIGNED AND
SEALED
MAR 24 1970

(SEAL)
Attest:

Edward M. Fletcher, Jr.
Attesting Officer

WILLIAM E. SCHUYLER, JR.
Commissioner of Patents